(12) United States Patent
Tanaka et al.

(10) Patent No.: US 11,372,159 B2
(45) Date of Patent: Jun. 28, 2022

(54) METHOD FOR FORMING GROOVE IN HYBRID OPTICAL DEVICE, AND HYBRID OPTICAL DEVICE

(71) Applicant: Nippon Telegraph and Telephone Corporation, Tokyo (JP)

(72) Inventors: Takuya Tanaka, Tokyo (JP); Makoto Abe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 28 days.

(21) Appl. No.: 17/258,566

(22) PCT Filed: Jun. 20, 2019

(86) PCT No.: PCT/JP2019/024490
§ 371 (c)(1),
(2) Date: Jan. 7, 2021

(87) PCT Pub. No.: WO2020/012909
PCT Pub. Date: Jan. 16, 2020

(65) Prior Publication Data
US 2021/0239901 A1  Aug. 5, 2021

(30) Foreign Application Priority Data
Jul. 11, 2018 (JP) .............................. JP2018-131405

(51) Int. Cl.
*G02B 6/122* (2006.01)
*C03C 23/00* (2006.01)
(Continued)

(52) U.S. Cl.
CPC .......... *G02B 6/122* (2013.01); *C03C 23/0025* (2013.01); *G02B 6/13* (2013.01); *G02B 2006/12038* (2013.01)

(58) Field of Classification Search
CPC ................................ G02B 6/122; G02B 6/13; G02B 2006/12038; G02B 6/132; G02B 6/4239;
(Continued)

(56) References Cited

U.S. PATENT DOCUMENTS 9,261,661 B2    2/2016  Ejiri et al.
10,668,561 B2 *  6/2020  Greenberg ............. B23K 26/53
(Continued)

FOREIGN PATENT DOCUMENTS

JP    H08254630 A    10/1996
JP    H1015682 A    1/1998
(Continued)

OTHER PUBLICATIONS

Himeno et al., "Silica-Based Planar Lightwave Circuits," IEEE Journal of Selected Topics in Quantum Electronics, vol. 4, No. 6, Nov./Dec. 1998, pp. 913-924. (as discussed in specification).
(Continued)

*Primary Examiner* — John Bedtelyon
(74) *Attorney, Agent, or Firm* — Slater Matsil, LLP

(57) ABSTRACT

A groove having any length is manufactured in a quartz-based waveguide chip without limitation of a chip size. A marker indicating a planned cutting line extending from a connection end surface of a quartz-based waveguide chip in an in-chip plane direction is formed in advance by processing a core layer of the waveguide of the quartz-based waveguide chip, an irradiation position of laser light is aligned with a position of a starting point of the marker in a state where quartz-based waveguide chip is placed on a stage, and a groove is manufactured in the connection end surface of the quartz-based waveguide chip by moving the stage in the extending direction of the marker while irradiating the quartz-based waveguide chip with the laser light from an upper side.

11 Claims, 12 Drawing Sheets

(51) Int. Cl.
*G02B 6/13* (2006.01)
*G02B 6/12* (2006.01)

(58) Field of Classification Search
CPC .............. G02B 2006/1208; G02B 6/36; G02B 2006/1204; C03C 23/0025; B28D 5/022; C03B 33/0222
See application file for complete search history.

(56) References Cited

U.S. PATENT DOCUMENTS

2010/0119808 A1* 5/2010 Li ........................... B41M 5/26
428/221
2020/0353567 A1* 11/2020 Matsuo ................. C03B 33/033

FOREIGN PATENT DOCUMENTS

| JP | 2000323441 A | 11/2000 |
| JP | 2008135717 A | 6/2008 |
| JP | 2014209206 A | 11/2014 |
| JP | 2017069243 A | 4/2017 |
| JP | 2018036433 A | 3/2018 |

OTHER PUBLICATIONS

Takenouchi, et al. "Phase-sensitive amplification technology using P-PLN," O plus E, vol. 37, No. 8, Aug. 2015, pp. 636-639. (as discussed in the specification).

* cited by examiner

METHOD FOR FORMING GROOVE IN HYBRID OPTICAL DEVICE, AND HYBRID OPTICAL DEVICE

CROSS-REFERENCE TO RELATED APPLICATIONS

This application is a national phase entry of PCT Application No. PCT/JP2019/024490, filed on Jun. 20, 2019, which claims priority to Japanese Application No. 2018-131405, filed on Jul. 11, 2018, which applications are hereby incorporated herein by reference.

TECHNICAL FIELD

Embodiments of the present invention relate to a method of manufacturing a hybrid optical device, and more particularly, to a method of manufacturing a groove in a hybrid optical device, in which a quartz-based waveguide chip and a secondary nonlinear waveguide chip having a periodically poled structure are bonded to each other, to prevent an adhesive from effusing to a connection end surface of the quartz-based waveguide chip with the secondary nonlinear waveguide chip.

BACKGROUND

A quartz-based PLC (Planar Lightwave circuit) is a quartz glass waveguide including a core and a clad in which quartz glass is deposited on a quartz substrate or a silicon substrate as a typical configuration example. The quartz-based PLC constitutes element circuits of a splitter, an AWG (Arrayed waveguide grating), an MZ (Mach-Zehender) interference circuit, and a TO (Thermo-Optic) switch, and is used as a key device for optical communication (for example, see Non-Patent Literature 1).

On the other hand, a phase sensitive amplifier using PPLN (Periodically Poled LiNbO3) can amplify an optical signal with low noise in digital coherent communication handling multilevel signals compared with a laser amplifier represented by a conventional EDFA (Erbium-Doped Fiber Amplifier), and thus is a promising device (for example, see Non-Patent Literature 2).

FIG. 6 is a schematic diagram showing a configuration of a conventional PPLN module. In FIG. 6, a PPLN module 300 includes an OPA (Optical parametric amplifier) module 310 to which an input optical fiber 301 and an output optical fiber 303 are connected and a second harmonic generation (SHG) module 320 to which an input optical fiber 302 and an output optical fiber 304 are connected.

In the OPA module 310, a collimating lens 311, a dichroic mirror 312, a condensing lens 313, a PPLN waveguide 314, a condensing lens 315, a dichroic mirror 316, and a collimating lens 317 are disposed in this order from the input side of light. In the SHG module 320, a collimating lens 321, a dichroic mirror 322, a condensing lens 323, a PPLN waveguide 324, a condensing lens 325, a dichroic mirror 326, and a collimating lens 327 are disposed in this order from the input side of light. The OPA module 310 and the SHG module 320 are connected to optical fiber 305. In addition, an EDFA (Erbium-Doped Fiber Amplifier) 306 and a BPF (Band Pass Filter) 307 are inserted between the input optical fiber 302 and the SHG module 320.

In the PPLN module 300, first, fundamental wave light of 1.54 m band is incident on the SHG module 320 from the input optical fiber 302 via the EDFA 306 and the BPF 307. After being converted into parallel light by the collimating lens 321 and passing through the dichroic mirror 322, the fundamental wave light is condensed by the condensing lens 323 and is incident on the PPLN waveguide 324. In the PPLN waveguide 324, the fundamental light wave is converted into second harmonic light (SH light) of 0.77 m band, which is excitation light, and is emitted from the PPLN waveguide 324. At this time, all the fundamental wave light is not converted into the SH light, and unconverted fundamental wave light is also emitted. After being converted into parallel light by the condensing lens 325, the SH light is separated from the fundamental wave light by the dichroic mirror 326 and is incident on the OPA module 310 via the optical fiber 305.

Signal light of 1.54 m band is incident on the OPA module 310 from the input optical fiber 301. The incident signal light is converted into parallel light by the collimating lens 311, is multiplexed with the SH light incident from the optical fiber 305 in the dichroic mirror 312, is condensed by the condensing lens 313, and is incident on the PPLN waveguide 314. In the PPLN waveguide 314, the signal light is amplified by a parametric effect with the SH light, and is emitted from the PPLN waveguide 314. At this time, all the SH light does not contribute to amplification of the signal light, and a part of the SH light is also emitted from the PPLN waveguide 314 together with the amplified signal light. The light emitted from the PPLN waveguide 314 is demultiplexed into unconverted SH light and amplified signal light by the dichroic mirror 316. The signal light is condensed by the collimating lens 317, is emitted from the OPA module 310, and is incident on the output optical fiber 303. In this way, the signal light of 1.54 m band is amplified.

However, as can be seen from FIG. 6, it is necessary to optically align and fix a plurality of lenses in order to connect the optical fibers 301 to 305 to the PPLN waveguides 314 and 324, and time and cost may be required to manufacture a module.

In order to solve such problems, hybrid integration of the quartz-based PLC and the PPLN waveguide has been attempted. FIG. 7 is a perspective view of a PLC-PPLN module in which a quartz-based waveguide chip 409 and a PPLN waveguide chip 405 are hybrid-integrated.

The quartz-based waveguide chip 409 includes a waveguide (not shown) including a core layer and a clad layer formed on an Si substrate using quartz-based glass as a main material.

The PPLN waveguide chip 405 includes a PPLN waveguide for OPA and SHG 404 at least in part.

The quartz-based waveguide chip 409 including the clad layer and the core layer is manufactured using a glass deposition technique and a photolithography technique on the Si substrate. FIG. 8 illustrates an example of including a flame hydrolysis deposition method (FHD method) as the glass deposition technique for manufacturing the quartz-based waveguide chip 409.

First, glass particulates subjected to thermolysis and hydrolysis by passing a gas raw material (main component: silicon tetrachloride) through an oxyhydrogen flame is deposited on an Si substrate 503, and thus glass particulate films 501 and 502 are formed (FIG. 8(A)).

Subsequently, the glass particulate films 501 and 502 are heated in an electric furnace to form a transparent glass film that covers an upper surface of the Si substrate 503. A two-layer structure of a lower clad layer 505 and a core layer 504 is manufactured by a change in a composition (GeO2 dopant concentration) of the glass film (FIG. 8(B)).

Next, with a photolithography technique similar to microlithography of an LSI pattern, a waveguide pattern is transferred to a resist coated on the surface of the core layer 504 using a photomask. Using the resist as an etching mask, the core layer 504 is removed by reactive ion etching (RIE) excluding a portion to be a core 504a, and then the resist is removed (FIG. 8(C)). The glass particulate film 506 is deposited again by the FHD method so as to cover the formed core 504a (FIG. 8(D)).

Then, the glass particulate film 5o6 is heated in the electric furnace, so that an upper clad layer 507 made of the transparent glass film is formed (FIG. 8(E)).

Thus, the quartz-based waveguide chip 409 is completed. The core 504a has a higher refractive index than the upper clad layer 507 and the lower clad layer 505. In general, the upper clad layer 507 and the lower clad layer 505 have the same refractive index. When light is incident on the core 504a, the light mainly propagates while being confined in the core 504a due to the fact that the refractive index of the core 504a is higher than the refractive index of the clad layers 505 and 507 surrounding the core.

In the examples of FIGS. 8(A) to 8(E), the FHD method is used as the glass deposition technique, but a chemical vapor deposition (CVD) may be used, for example.

On the other hand, the PPLN waveguide chip 405 can be manufactured using direct bonding and etching. Specifically, using a Zn-added LiNbO3 substrate as a core layer, the LiNbO3 substrate is first subjected to polarization inversion, the LiNbO3 substrate having the periodically poled structure is directly bonded to the LiTaO3 substrate to be a clad layer, and then the LiNbO3 substrate is thinned and laterally confined by etching to form a ridge type optical waveguide structure (for example, see Non-Patent Literature 2).

FIG. 9 is a plan view showing a configuration of the PLC-PPLN module (hybrid optical device) shown in FIG. 7. Here, portions corresponding to fiber blocks 402 and 413 in FIG. 7 are not presented, and a configuration is shown in which the quartz-based waveguide chip 409 and the PPLN waveguide chip 405 are connected to each other.

From an input waveguide 6oi, fundamental wave light of 1.54 m band is incident. Since polarization inversion distribution is provided in a PPLN waveguide 602 (corresponding to the PPLN waveguide 320 in FIG. 6) in a cycle that is phase-matched with the second harmonic generation, the fundamental wave light of 1.54 m band is converted into excitation light of 0.77 m band. The excitation light of 0.77 m band and unconverted fundamental wave light of 1.54 m band are incident on a port 603 of the quartz-based waveguide chip 409, propagate through a waveguide 620, and then are incident on a directional coupler 605. Out of the light incident on the directional coupler 605, most of the fundamental wave light of 1.54 m band is output from a cross port of the directional coupler 605 to a waveguide 607, and the excitation light of 0.77 m band is output from a through port of the directional coupler 605 to a waveguide 606.

The excitation light of 0.77 m band and slight fundamental wave light of 1.54 m band propagating through the waveguide 606 are incident on a directional coupler 608. Out of the light incident on the directional coupler 608, the excitation light of 0.77 m band is output from a through port of the directional coupler 608 to a waveguide 611 and is incident on a directional coupler 612. The fundamental wave light of 1.54 m band is output from a cross port of the directional coupler 608 to a port 609 via a waveguide 621.

On the other hand, signal light of 1.54 m band is incident from a port 610 on a connection end surface with the optical fiber (optical fiber 414 in FIG. 7). The signal light propagates through a waveguide 622, and then is incident on a directional coupler 612. In the directional coupler 612, the signal light and the excitation light of 0.77 m band are multiplexed, and the multiplexed signal light and excitation light is coupled to the port of the PPLN waveguide chip 405. In other words, the multiplexed light of the signal light and the excitation light is output from the directional coupler 612 to a waveguide 623, and is output to a port 614 on a connection end surface with the PPLN waveguide chip 405.

In PPLN waveguide 616 (corresponding to the PPLN waveguide 314 in FIG. 6) in the PPLN waveguide chip 405, phase matching is performed by polarization inversion distribution of the waveguide 616 such that the signal light having the wavelength band of 1.54 m is parametrically amplified by the excitation light of 0.77 m band, and the signal light having the wavelength band of 1.54 km is amplified. The amplified signal light is output from a port 617 on the connection end surface with the optical fiber (optical fiber 401 in FIG. 7).

Next, a method of processing the quartz-based waveguide chip 409 and bonding it to the PPLN waveguide chip 405 will be described. FIG. 10 is an enlarged perspective view of a connection end surface of the quartz-based waveguide chip 409 with the PPLN waveguide chip 405, and FIG. 11 is a diagram for explaining a method of manufacturing a groove 406 in the quartz-based waveguide chip 409.

As shown in FIG. 11, Pyrex (registered trademark) plates 802 and 806 is stuck to an upper surface and a lower surface of the quartz-based waveguide chip 409, as a reinforcing material at the time of processing, and two grooves 406 are formed in a thickness direction of the quartz-based waveguide chip 409 at desired positions of a connection end surface 701 with the PPLN waveguide chip 405 to extend from the connection end surface 701 toward the inside of the chip, specifically, such that the connection end surface 701 of the quartz-based waveguide chip 409 is divided into a region 720 in which a waveguide is formed and light propagates and regions 719, in which light does not propagate, on both sides thereof. A dicing saw is used to form the grooves 406. In FIG. 11, a blade of the dicing saw is denoted by 801.

Next, the Pyrex plates 802 and 806 used as the reinforcing material are removed from the quartz-based waveguide chip 409. As shown in FIG. 10, reinforcement glass sheets (reinforcing glass material) 407 and 408 to be reinforced during polishing and connection adhere to the upper surface and the lower surface of the quartz-based waveguide chip 409 with an adhesive such that end surfaces is flush with the connection end surface 701, reinforcement glass sheets 410 and 411 similarly adhere to the upper surface and the lower surface of the quartz-based waveguide chip 409 with an adhesive such that end surfaces is flush with a connection end surface 702 opposite to the of the connection end surface 701 of quartz-based waveguide chip 409, and the connection end surfaces 701 and 702 are polished.

At this time, two grooves 703 having the same spacing and width as the grooves 406 formed on the connection end surface 701 are formed on the end surfaces of the reinforcement glass sheets 407 and 408 on the connection end surface 701 side, and the reinforcement glass sheets 407 and 408 adhere to the upper surface and the lower surface of the quartz-based waveguide chip 409 such that the groove 406 of the quartz-based waveguide chip 409 coincides with positions of the grooves 703 of the reinforcement glass sheets 407 and 408.

After the connection end surfaces 701 and 702 of the quartz-based waveguide chip 409 are polished, an ultraviolet curable adhesive 713 is applied to the regions 719, in which light does not propagate, outside the grooves 406 and 703 on the connection end surface 701 to allow the connection end surface 701 and the connection end surface of the PPLN waveguide chip 405 to face each other. Then, after optical axes of the waveguide of the quartz-based waveguide chip 409 and the waveguide of the PPLN waveguide chip 405 are adjusted, the ultraviolet curable adhesive 713 is irradiated with ultraviolet rays to bond the quartz-based waveguide chip 409 and the PPLN waveguide chip 405 together.

In this example, since the connection end surface 701 of the quartz-based waveguide chip 409 is divided, by the grooves 406 and 703, into the region 720 in which the waveguide is formed and the regions 719 on both sides in which light does not propagate, the ultraviolet curable adhesive 713 applied to the regions 719, in which light does not propagate, does not effuse into the region 720.

Between the region 720 of the connection end surface 701 and the connection end surface of the PPLN waveguide chip 405, a slight gap corresponding to the thickness of the ultraviolet curable adhesive 713 exists. After the ultraviolet curable adhesive 713 is cured, the gap is filled with a high light resistance resin 714, and thus losses due to a main factor other than a reflection loss caused by the difference in refractive index between the quartz glass and LiNbO3 do not occur in the light incident on the PPLN waveguide chip 405 from the quartz-based waveguide chip 409.

The ultraviolet curable adhesive is not applied to the optical path (the region 720 where the waveguide is formed) because the ultraviolet curable adhesive deteriorates and a transmission loss increases when high-intensity light of 0.8 m band or a shorter wavelength passes through a general ultraviolet curable adhesive. However, if an adhesive is found which does not deteriorate even under the above conditions by change in a composition of the ultraviolet curable adhesive, the adhesive may be applied to the optical path.

The same applies to the connection between the PPLN waveguide chip 405 and the optical fiber 401 and the connection between the quartz-based waveguide chip 409 and the optical fiber 414 in FIG. 7. Specifically, two grooves 403 are manufactured in a thickness direction of the fiber block 402 such that a connection end surface of the fiber block 402, which fixes the optical fiber 401, with the PPLN waveguide chip 405 is divided into a region in which the optical fiber 401 is disposed and light propagates and regions, in which light does not propagate, on both sides thereof. Then, an ultraviolet curable adhesive is applied to the regions, in which light does not propagate, outside the grooves 403 on the connection end surface of the fiber block 402 to allow the connection end surface and the connection end surface of the PPLN waveguide chip 405 to face each other. Then, after optical axes of the optical fiber 401 and the waveguide of the PPLN waveguide chip 405 are adjusted, the ultraviolet curable adhesive is irradiated with ultraviolet rays to bond the fiber block 402 and the PPLN waveguide chip 405 together. In addition, a high light resistance resin is filled in a gap between the region, in which the optical fiber 401 is disposed and light propagates, of the connection end surface of the fiber block 402 and the connection end surface of the PPLN waveguide chip 405.

Similarly, two grooves 412 are manufactured in a thickness direction of the fiber block 413 such that a connection end surface of the fiber block 413, which fixes the optical fiber 414, with the quartz-based waveguide chip 409 is divided into a region in which the optical fiber 414 is disposed and light propagates and regions, in which light does not propagate, on both sides thereof. Then, an ultraviolet curable adhesive is applied to the regions, in which light does not propagate, outside the grooves 412 on the connection end surface of the fiber block 413 to allow the connection end surface and the connection end surface of the quartz-based waveguide chip 409 to face each other. Then, after optical axes of the optical fiber 414 and the waveguide of the quartz-based waveguide chip 409 are adjusted, the ultraviolet curable adhesive is irradiated with ultraviolet rays to bond the fiber block 413 and the quartz-based waveguide chip 409 together. In addition, a high light resistance resin is filled in a gap between the region, in which the optical fiber 414 is disposed and light propagates, of the connection end surface of the fiber block 413 and the connection end surface of the quartz-based waveguide chip 409.

The inventors have proposed a connection structure between the quartz-based waveguide chip 409 and the PPLN waveguide chip 405 as described above (Japanese Patent Application No. 2017-222180).

Here, when the groove 406 is formed in the quartz-based waveguide chip 409 as shown in FIG. 11, blade dicing is used in the conventional method. Hereinafter, the blade dicing is abbreviated and will be referred to as dicing.

As described above, the dicing is performed in the state where the Pyrex plates 802 and 806 adhere to the upper surface and the lower surface of the quartz-based waveguide chip 409 and the quartz-based waveguide chip 409 is raised such that the connection end surface 701, in which the groove 406 is formed, faces upward. The reason why the dicing is performed in the state where the quartz-based waveguide chip 409 is raised in this way that the quartz-based waveguide chip 409 cannot be deeply cut in the thickness direction when the quartz-based waveguide chip 409 is placed horizontally.

FIG. 12 illustrates a situation in which the quartz-based waveguide chip 409 is placed horizontally with respect to a stage of a dicing saw and a groove is processed by a blade 801. A thickness L2 of the quartz-based waveguide chip 409 is about 1 mm, and a radius L1 of the blade 801 is about 25 mm. From a geometrical consideration, a length L3 in FIG. 12 is 7 mm.

Even when the end of the quartz-based waveguide chip 409 is dug to a depth of 1 mm, the depth of the groove becomes shallower toward the inside of the quartz-based waveguide chip 409. For this reason, it is difficult to manufacture the groove 406 with the dicing in the state where the quartz-based waveguide chip 409 is placed horizontally. Therefore, the dicing is performed in the state where the quartz-based waveguide chip 409 is raised.

However, in a general dicing saw, even when the blade is raised from the stage surface, the distance of the bottom surface of the blade from the stage is limited to about 20 mm at the maximum. Therefore, there is a problem that the length of the quartz-based waveguide chip 409, in which the groove 406 can be manufactured, in the incident/emission direction of light (length in the left and right direction in FIGS. 7, 9, and 10) is limited. When the size of the quartz-based waveguide chip 409 is limited, the layout inside the quartz-based waveguide chip 409 is limited. Further, when a wavelength filter such as AWG or MZI is added to the components of the quartz-based waveguide chip 409 shown in FIG. 9, the chip size increases, but such a component is difficult to be added in some cases.

Accordingly, in order to remove the limitation on the size of the quartz-based waveguide chip 409, the groove 406 has been desirably manufactured by methods other than the dicing saw.

CITATION LIST

Non-Patent Literature

Non-Patent Literature 1: A. Himeno, K. Kato, and T. Miya, "Silica-based planar lightwave circuits", IEEE JOURNAL OF SELECTED TOPICS IN QUANTUM ELECTRONICS, vol. 4, no. 6, 1998, pp. 913-924; and Non-Patent Literature 2: Hirokazu Takenouchi, Takeshi Umeki, Masaki Asobe, and Yutaka Miyamoto, "Phase sensitive amplification technique using PPLN", O plus E, vol. 37, No. 8, 2015, pp. 636-639.

SUMMARY

Technical Problem

Embodiments of the present invention have been made to solve the above problems, and an object thereof is to provide a method of manufacturing a groove of a hybrid optical device capable of easily manufacturing a groove having any length in a quartz-based waveguide chip without limitation of a chip size, and a hybrid optical device.

Means for Solving the Problem

Embodiments of the present invention are to provide a method of manufacturing a groove in a hybrid optical device in which the groove is provided on a connection end surface of a quartz-based waveguide chip with a secondary nonlinear waveguide chip having a periodically poled structure to divide a region where a waveguide through which light propagates is formed from a region where light does not propagate and in which the connection end surface of the quartz-based waveguide chip is bonded to a connection end surface of the secondary nonlinear waveguide chip facing the connection end surface of the quartz-based waveguide chip with an adhesive provided in the region where the light does not propagate in the connection end surface of the quartz-based waveguide chip, the method including: a step of forming a marker indicating a planned cutting line extending from the connection end surface of the quartz-based waveguide chip in an in-chip plane direction by processing a core layer of a waveguide of the quartz-based waveguide chip; a step of aligning an irradiation position of laser light with a position of a starting point of the marker in a state where quartz-based waveguide chip is placed on a stage; and a step of manufacturing the groove on the connection end surface of the quartz-based waveguide chip so as to divide the region where the light propagates from the region where the light does not propagate by moving the stage in the extending direction of the marker while irradiating the quartz-based waveguide chip with the laser light from an upper side.

In the method of manufacturing a groove in a hybrid optical device of the according to a configuration example of the present invention, the quartz-based waveguide chip is formed with the waveguide, which is made of quartz-based glass as a main material, on a substrate made of quartz-based glass, laser light is irradiated from one laser when the groove is manufactured, and an oscillation wavelength of the laser is in a wavelength band corresponding to absorption characteristics of the quartz-based glass.

In the method of manufacturing a groove in a hybrid optical device of the according to a configuration example of the present invention, the quartz-based waveguide chip is formed with the waveguide, which is made of quartz-based glass as a main material, on an Si substrate, when the groove is manufactured, laser light is irradiated from a first laser to process the quartz-based glass, and laser light is irradiated from a second laser to process the Si substrate, and an oscillation wavelength of the first laser is in a wavelength band corresponding to absorption characteristics of the quartz-based glass, and an oscillation wavelength of the second laser is in a wavelength band corresponding to absorption characteristics of Si.

In the method of manufacturing a groove in a hybrid optical device of the according to a configuration example of the present invention, the step of aligning the irradiation position of the laser light with the position of the starting point of the marker includes: a step of irradiating the quartz-based waveguide chip with the laser light in the state where the quartz-based waveguide chip is placed on the stage to form a scratch on a surface of the quartz-based waveguide chip; a step of moving the stage and obtaining coordinates of the starting point of the marker based on a position of the stage at a time when the starting point of the marker comes to a center of a visual field of a microscope installed above the quartz-based waveguide chip; a step of moving the stage and obtaining, based on a position of the stage at a time when a center of the scratch comes to the center of the visual field of the microscope, coordinates of the center of the scratch; and a step of aligning the irradiation position of the laser light with the position of the starting point of the marker by moving the stage based on relative coordinates of the scratch with respect to the starting point of the marker.

In the method of manufacturing a groove in a hybrid optical device of the according to a configuration example of the present invention, the step of aligning the irradiation position of the laser light with the position of the starting point of the marker includes: a step of irradiating the quartz-based waveguide chip with the laser light from the first laser in the state where the quartz-based waveguide chip is placed on the stage to form a scratch on a surface of the quartz-based waveguide chip; a step of moving the stage and obtaining coordinates of the starting point of the marker based on a position of the stage at a time when the starting point of the marker comes to a center of a visual field of a microscope installed above the quartz-based waveguide chip; a step of moving the stage and obtaining, based on a position of the stage at a time when a center of the scratch comes to the center of the visual field of the microscope, coordinates of the center of the scratch; a step of aligning an irradiation position of the laser light from the first laser with the position of the starting point of the marker by moving the stage based on relative coordinates of the scratch with respect to the starting point of the marker; and a step of aligning an irradiation position of the laser light from the second laser with the position of the starting point of the marker by moving the stage based on the relative coordinates of the scratch with respect to the starting point of the marker and known relative coordinates of the irradiation position of the second laser with respect to the irradiation position of the first laser.

In the method of manufacturing a groove in a hybrid optical device of the according to a configuration example of the present invention, the step of manufacturing the groove includes a step blowing off a component vaporized by the irradiation of the laser light with an assist gas.

A hybrid optical device of embodiments of the present invention includes: a quartz-based waveguide chip including a first waveguide formed of quartz-based glass as a main material; and a secondary nonlinear waveguide chip including a second waveguide formed of a secondary nonlinear optical material having a periodically poled structure, wherein a groove is formed on a connection end surface of the quartz-based waveguide chip with the secondary nonlinear waveguide chip to divide a region where the first waveguide through which light propagates is formed from a region where light does not propagate, the connection end surface of the quartz-based waveguide chip is bonded to a connection end surface of the secondary nonlinear waveguide chip facing the connection end surface of the quartz-based waveguide chip with an adhesive provided in the region where the light does not propagate in the connection end surface of the quartz-based waveguide chip with the secondary nonlinear waveguide chip, and a marker extending further in an in-chip plane direction from an end point of the groove extending in the in-chip plane direction from the connection end surface of the quartz-based waveguide chip is formed in a core layer of the first waveguide of the quartz-based waveguide chip.

Effects of Embodiments of the Invention

According to embodiments of the present invention, a marker indicating a planned cutting line extending from a connection end surface of a quartz-based waveguide chip in an in-chip plane direction is formed in advance by processing a core layer of the waveguide of the quartz-based waveguide chip, an irradiation position of laser light is aligned with a position of a starting point of the marker in a state where quartz-based waveguide chip is placed on a stage, and a groove is manufactured in the connection end surface of the quartz-based waveguide chip so as to divide a region where the light propagates from a region where the light does not propagate by moving the stage in the extending direction of the marker while irradiating the quartz-based waveguide chip with the laser light from an upper side, thereby the groove having any length can be easily manufactured in the quartz-based waveguide chip without limitation of a chip size.

DETAILED DESCRIPTION OF ILLUSTRATIVE EMBODIMENTS

Figure 1:
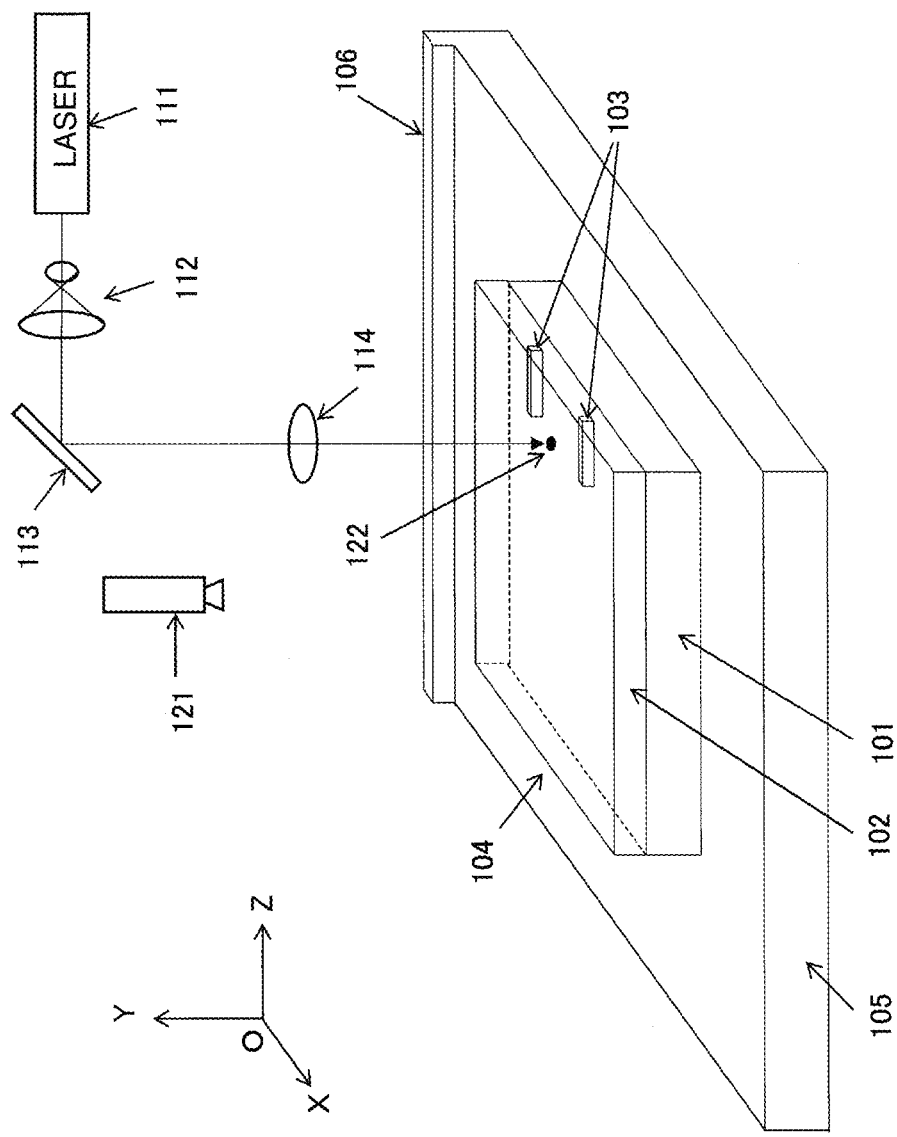
FIG. 1 is a diagram for explaining a method of manufacturing a groove in a hybrid optical device according to a first embodiment of the present invention.

Referring to the drawings, Embodiments of the present invention will be described in detail below.

First Embodiment

FIG. 1 is a diagram for explaining a method of manufacturing a groove in a hybrid optical device according to a first embodiment of the present invention. A quartz-based waveguide chip 104 used herein includes a quartz substrate 101, a quartz-based glass clad 102 deposited on the quartz substrate 101, and a core (only a marker 103 being presented) formed inside the quartz-based glass clad 102.

The quartz-based waveguide chip 104 is placed on an XZ stage 105. The XZ stage 105 includes a vacuum chuck (not shown) so that the quartz-based waveguide chip 104 placed on the stage can be attached and fixed. Note that the attaching may be performed not only by the vacuum chuck but also by another method.

Figure 8:
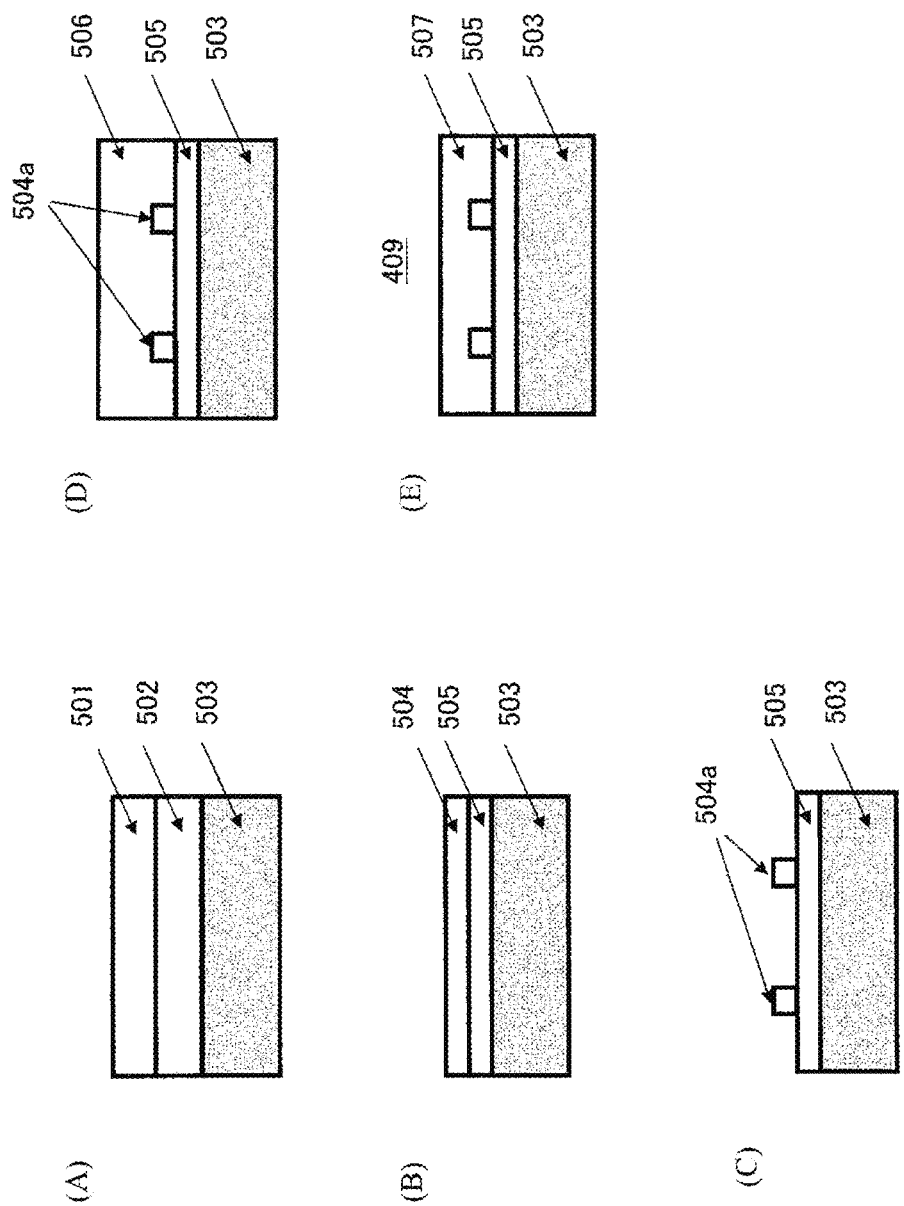
FIG. 8 is a cross-sectional view showing an example of a process of manufacturing a quartz-based waveguide chip.

The marker 103 indicating a planned cutting line of the quartz-based waveguide chip 104 is formed by processing a core layer in the quartz-based glass clad 102 in a process of manufacturing the quartz-based waveguide chip 104. In FIG. 8, when a core layer 504 is processed by photolithography and reactive ion etching to form a core 504a, if a marker is put in a mask pattern of a photomask used for the photolithography, the core 504a is formed to propagate signal light and a core (not shown in FIG. 8) corresponding to the marker is also formed at the same time. The marker 103 is formed so as to extend in an in-chip plane direction (direction orthogonal to the connection end surface) from a connection end surface of the quartz-based waveguide chip 104 with a PPLN waveguide chip (secondary nonlinear waveguide chip). Since glass constituting the core has a higher refractive index than the quartz-based glass clad 102, the marker 103 formed in the quartz-based glass clad 102 can be recognized with a microscope due to a refractive index contrast.

Advantages of manufacturing the marker 103 in the same layer and with the same material as the core will be described below. A first advantage is that no additional steps are required to manufacture the marker 103. Since a core pattern can be manufactured in a lump by photolithography using a photomask, the core constituting the waveguide, through which light is transmitted, and the marker 103 can be manufactured at the same time. In addition, since the mask pattern of the photomask can be accurately formed with submicron accuracy, there is also an advantage that the marker 103 can be provided at an accurate position on the quartz-based waveguide chip 104.

In the present embodiment, since the quartz substrate 101 and the quartz-based glass clad 102 are made of quartz-based glass, as a laser 111 for processing the quartz-based waveguide chip 104 to form a groove (corresponding to a groove 406 in FIGS. 7, 9, and 10), a laser configured to oscillate a wavelength to be absorbed by the quartz-based glass may be used. For example, a CO2 laser having an oscillation wavelength of 10.6 m is used. In other words, the oscillation wavelength of the CO2 laser is in a wavelength band corresponding to absorption characteristics of the quartz-based glass. The laser 11 may be used for a pulse oscillation or a CW (Continuous Wave) oscillation in the present embodiment.

A beam expander 112 converts the light oscillated from the laser 111 into expanded collimated light. A horizontal/vertical optical path conversion mirror 113 converts a direction of the beam so that the light beam passing through the beam expander 112 is reflected vertically. A condensing lens 114 condenses the light reflected by the horizontal/vertical optical path conversion mirror 113 and narrows a diameter of the beam. Thus, as shown in FIG. 1, the quartz-based waveguide chip 104 is irradiated with the CO2 laser light from above. The CO2 laser light is absorbed by the quartz-based glass, which constitutes the quartz substrate 101 and the quartz-based glass clad 102, and is converted into heat.

The quartz-based glass is melted by an increase in power of the laser 11. Then, an assist gas such as a nitrogen gas is sprayed from a nozzle (not shown) mounted coaxially with the condensed laser light with which the quartz-based waveguide chip 104 is irradiated, thereby a vaporized glass component is blown off. In this way, a groove is formed in the quartz-based waveguide chip 104 when the quartz-based glass is melted with the laser light and the vaporized glass component is blown off with the assist gas. A width of the groove is 100 m to 500 m. When the width of the groove is larger than the size of a spot condensed by the condensing lens 114, the XZ stage 105 moves in an XZ plane to slightly shift an irradiation position of the condensed laser light on the quartz-based waveguide chip 104, the spot condensed on the quartz-based waveguide chip 104 is reciprocated several times, and thus a groove is processed.

Figure 2:
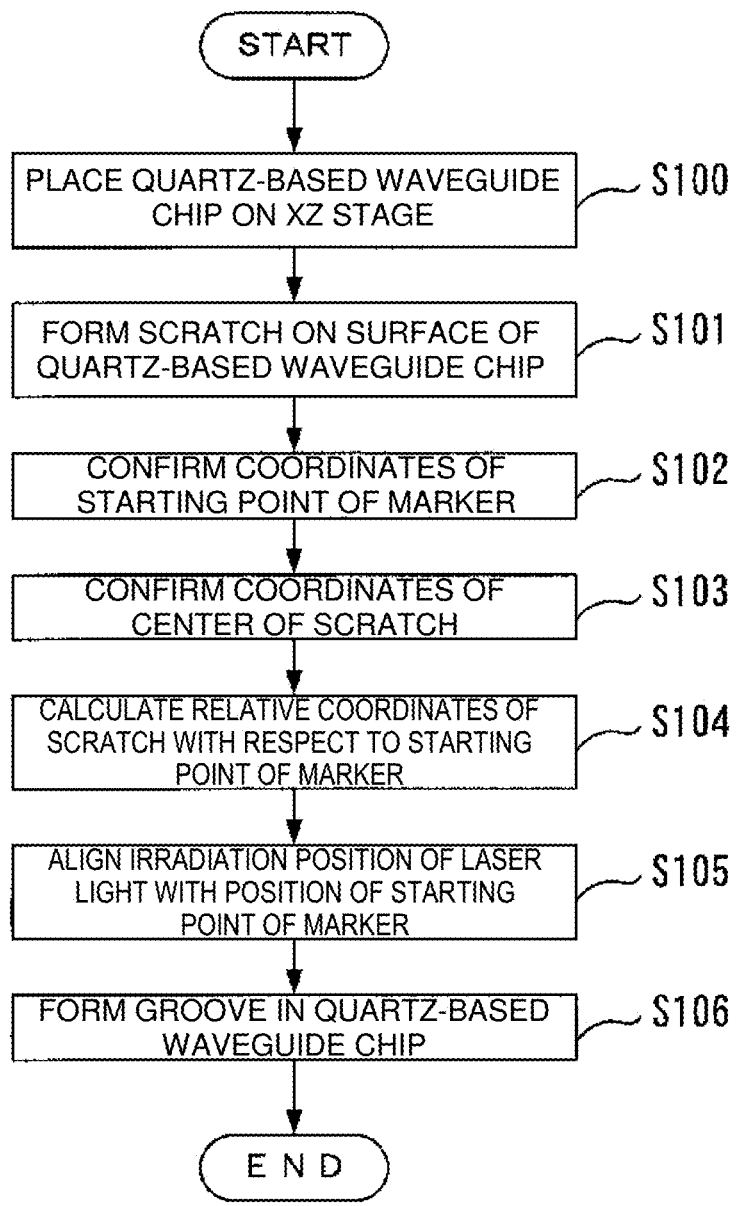
FIG. 2 is a flowchart for explaining the method of manufacturing the groove in the hybrid optical device according to the first embodiment of the present invention.

A method of aligning the beam position and position of the groove will be described below. FIG. 2 is a flowchart for explaining a groove manufacturing method of the present embodiment.

First, the quartz-based waveguide chip 104 is placed on the XZ stage 105 so that a Z-axis direction of the XZ stage 105 is parallel to an in-chip plane extending direction of the groove in the quartz-based waveguide chip 104 (extending direction of the marker 103), and the quartz-based waveguide chip 104 is attached and fixed (step S100 in FIG. 2) as described above. An example of a simple placing method includes a method of previously providing a rectangular parallelepiped projection 106, a side surface of which is parallel to the Z-axis direction, on the XZ stage 105 and pressing the quartz-based waveguide chip 104 against the side surface of the projection 106 to be parallel. Here, a side surface of the quartz-based waveguide chip 104 to be pressed against the side surface of the projection 106 and the in-chip plane extending direction of the groove to be formed in the quartz-based waveguide chip 104 are generally parallel to each other.

After the quartz-based waveguide chip 104 is placed on the XZ stage 105, the quartz-based waveguide chip 104 is irradiated with the CO2 laser light to form a scratch 122 on the surface of the quartz-based waveguide chip 104 (step S101 in FIG. 2). At this time, the laser light is irradiated for a short time so that the scratch 122 is formed only on the surface of the quartz-based waveguide chip 104.

Next, the microscope 121 confirms XZ coordinates (X1, Z1) of a starting point of the marker 103 (step S102 in FIG. 2). Specifically, a position of the XZ stage 105 at a time when the XZ stage 105 moves and the starting point (an intersection of the end surface of the quartz-based waveguide chip 104 and the marker 103) of the marker 103 comes to a center of a visual field of the microscope 121 is recorded as the XZ coordinates (X1, Z1) of the starting point of the marker 103.

Subsequently, the microscope 121 confirms XZ coordinates (X2, Z2) of a center of the scratch 122 as in the starting point of the marker 103 (step S103 in FIG. 2).

In this way, the starting point of the marker 103 and the XZ coordinates of the respective scratches 122 are confirmed, and differences ($\Delta X=X1-X2$ and $\Delta Z=Z1-Z2$) between the XZ coordinates (X1, Z1) of the starting point of the marker 103 and the XZ coordinates (X2, Z2) of the center of the scratch 122 are calculated, so that a relative coordinate of the scratch 122 (=irradiation position of the laser) with respect to the starting point of the marker 103 can be calculated (step S104 in FIG. 2).

Therefore, the XZ stage 105 is moved to set the position of the XY stage 105 to a position ($X1+\Delta X$, $Z1+\Delta Z$) obtained by adding the differences $\Delta X$ and $\Delta Z$ to the XZ coordinates (X1, Z1) of the starting point of the marker 103, so that the irradiation position of the laser light can be aligned with the position of the starting point of the marker 103 (step S105 in FIG. 2).

After such alignment, the groove is formed in the quartz-based waveguide chip 104 in such a manner that the quartz-based waveguide chip 104 is irradiated with the CO2 laser light and the XZ stage 105 is moved in Z-axis direction (step S106 in FIG. 2). The irradiation of the CO2 laser light from the laser 111 is stopped at the starting point at the time when the groove of a desired length is formed along the marker 103.

Although the groove is formed along the marker 103 by moving the XZ stage 105 in the Z-axis direction, the groove is preferably formed to have a margin in a length of the marker 103 in the in-chip plane direction rather than the desired length of the groove in the in-chip plane direction (Z-axis direction). Although the irradiation of the CO2 laser light is stopped at the time when the groove of the desired length is formed in the quartz-based waveguide chip 104, the marker 103 remains on the quartz-based waveguide chip 104 in the extending direction of the groove at this point of time. In this way, since the marker 103 remains, it is possible to confirm whether the groove is accurately manufactured along the marker 103.

Figure 7:
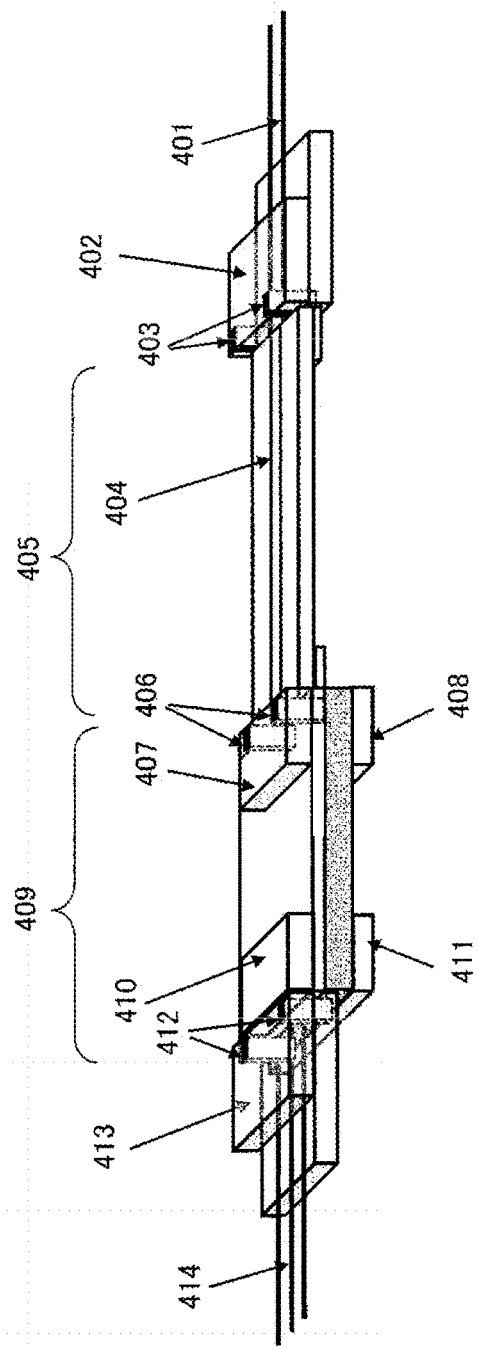
FIG. 7 is a perspective view showing a configuration of a hybrid optical device in which a PPLN waveguide chip and a quartz-based waveguide chip are integrated.
Figure 9:
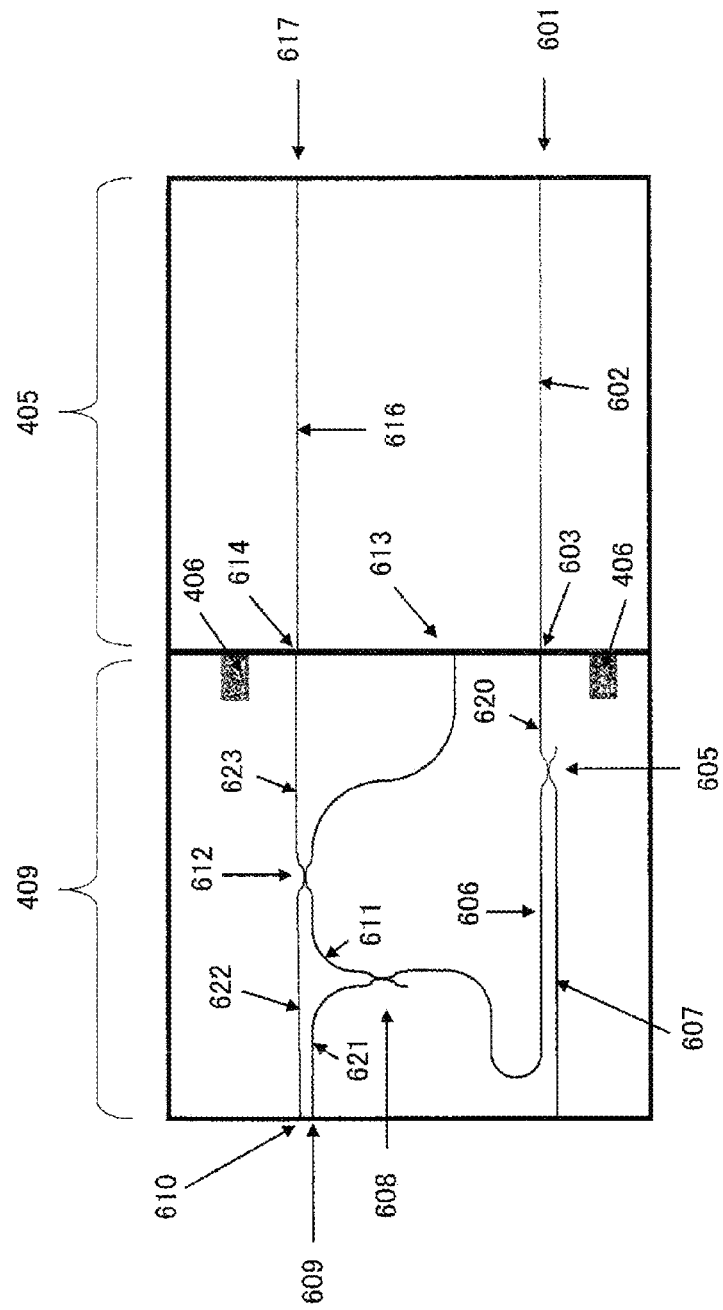
FIG. 9 is a plan view showing a configuration of a waveguide of the hybrid optical device shown in FIG. 7.
Figure 10:
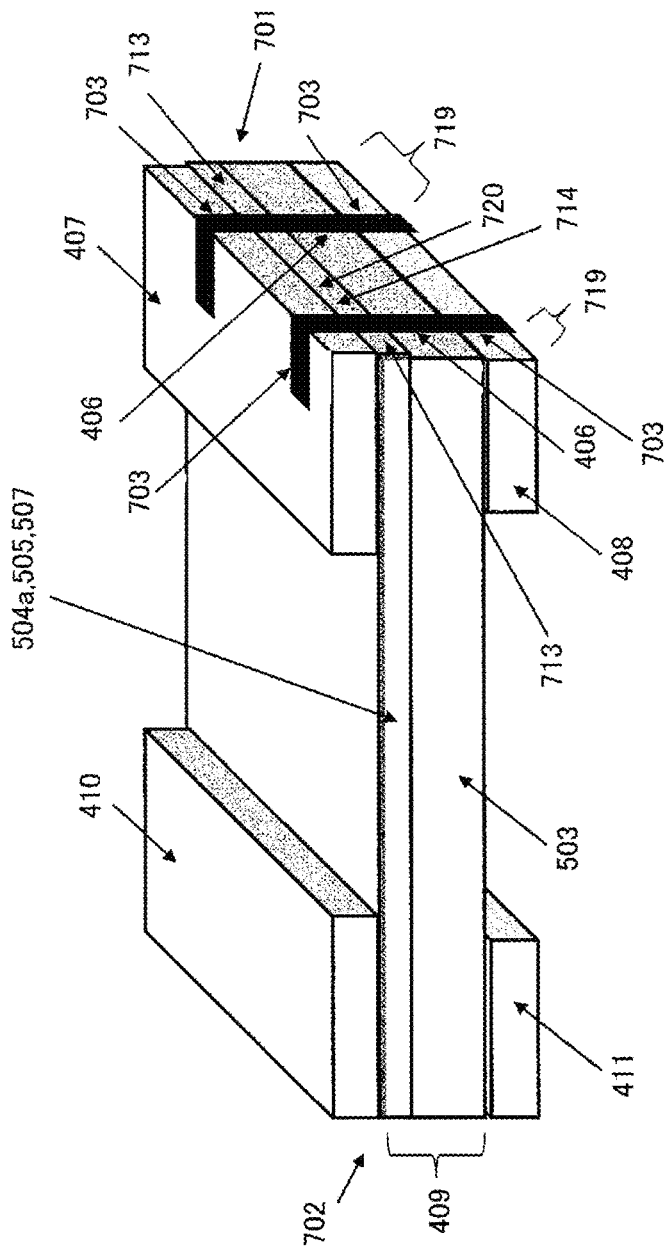
FIG. 10 is an enlarged perspective view of a connection end surface of the quartz-based waveguide chip with a PPLN waveguide chip.
Figure 11:
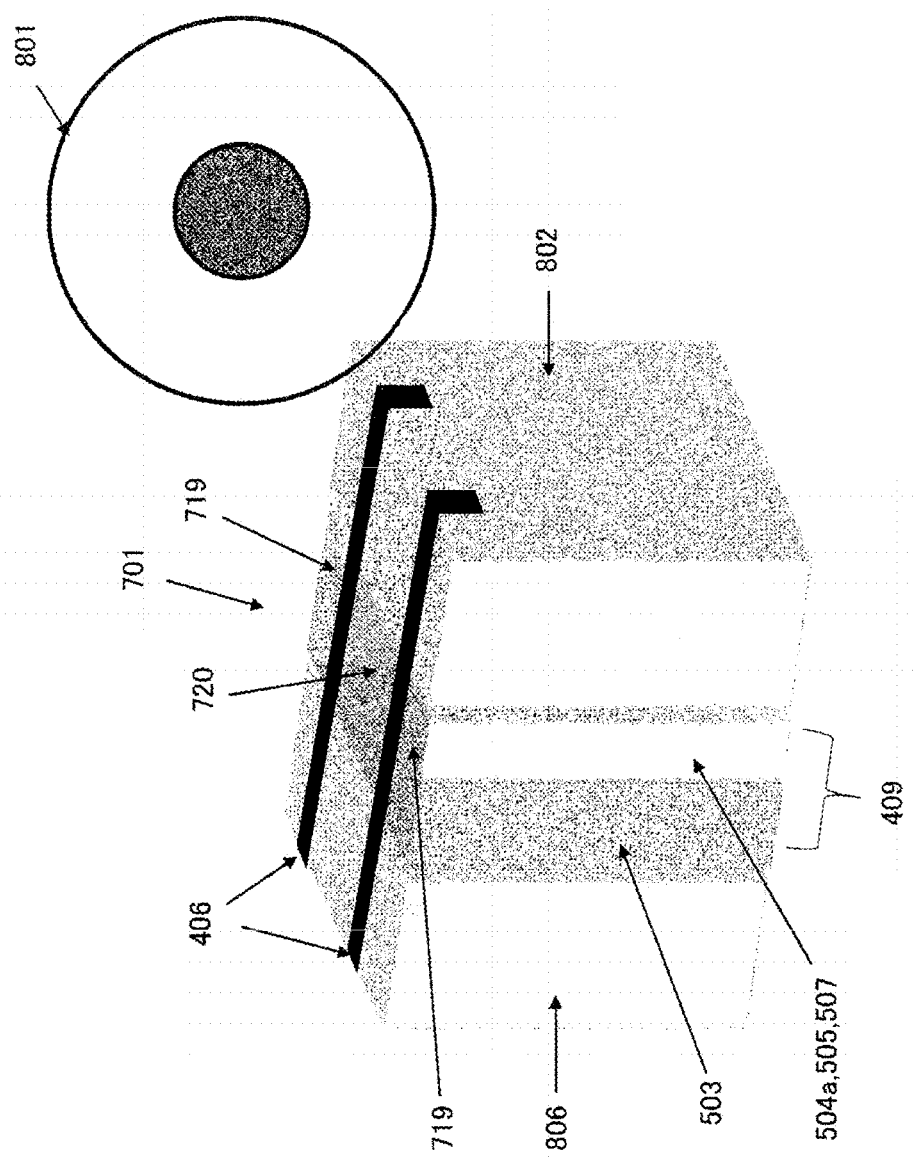
FIG. 11 is a diagram for explaining a method of manufacturing a groove in the quartz-based waveguide chip by dicing.
Figure 12:
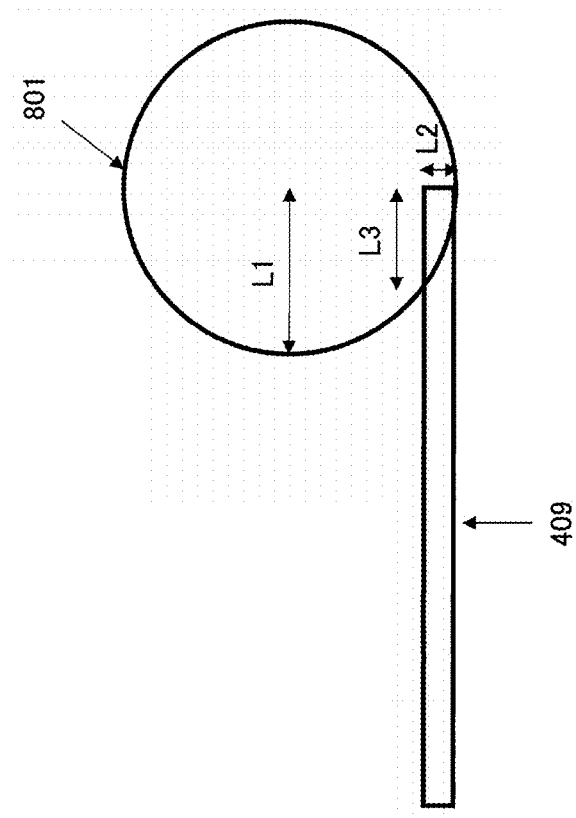
FIG. 12 is a diagram showing a method of processing the groove in a state where the quartz-based waveguide chip is placed horizontally on a stage of a dicing saw.

As is clear from the description of FIGS. 7, 9, and 10, since it is necessary to form grooves in two positions of the quartz-based waveguide chip 104, the marker 103 is also formed in two positions. Accordingly, after the process described in FIG. 2 is performed for one marker 103, the processes of steps S102 to S1o6 may be performed again for the other marker 103.

Thus, in the present embodiment, the groove is formed in the quartz-based waveguide chip 104 by laser processing, and thus it is possible to easily manufacture the groove of any length without being restricted by the chip size.

Figure 3:
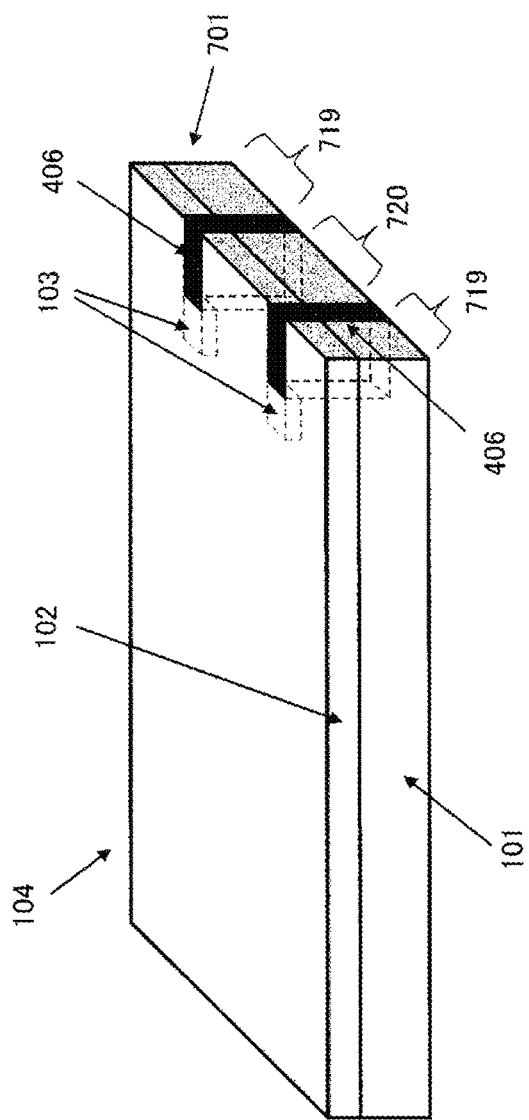
FIG. 3 is an enlarged perspective view of a connection end surface of a quartz-based waveguide chip, in which the groove is manufactured, with a PPLN waveguide chip according to the first embodiment of the present invention.

FIG. 3 is an enlarged perspective view of the connection end surface of the quartz-based waveguide chip 104, in which the groove is manufactured, with the PPLN waveguide chip (secondary nonlinear waveguide chip), and the same components as those in FIG. 10 are denoted by the same reference numerals. In FIG. 3, reference numeral 406 indicates the groove manufactured in the quartz-based waveguide chip 104, and reference numeral 701 indicates the connection end surface of the quartz-based waveguide chip 104 with the PPLN waveguide chip. The connection end surface 701 of the quartz-based waveguide chip 104 is divided by two grooves 406 into a region 720 in which a waveguide is formed and light propagates and regions 719, in which light does not propagate, on both sides thereof.

As is clear from the description of FIGS. 7 and 10, it is necessary to form two grooves having the same spacing and the same width as the grooves 406 of the quartz-based waveguide chip 104 on reinforcement glass sheets (corresponding to the reinforcement glass sheets 407 and 408 in FIGS. 7 and 10) attached to upper and lower sides of the quartz-based waveguide chip 104. However, since the reinforcement glass sheet is smaller than the quartz-based waveguide chip 104, the groove can be easily manufactured in the reinforcement glass sheet using a dicing saw.

A method of bonding the quartz-based waveguide chip 104 and the PPLN waveguide chip (secondary nonlinear waveguide chip) is the same as the method described with reference to FIGS. 7 to 10, and thus will not be described.

In the present embodiment, the $CO_2$ laser having the oscillation wavelength of 10.6 m is used for processing the quartz-based glass, but laser light of the wavelength band to be absorbed by the quartz-based glass may be used without being limited thereto.

Second Embodiment

Figure 4:
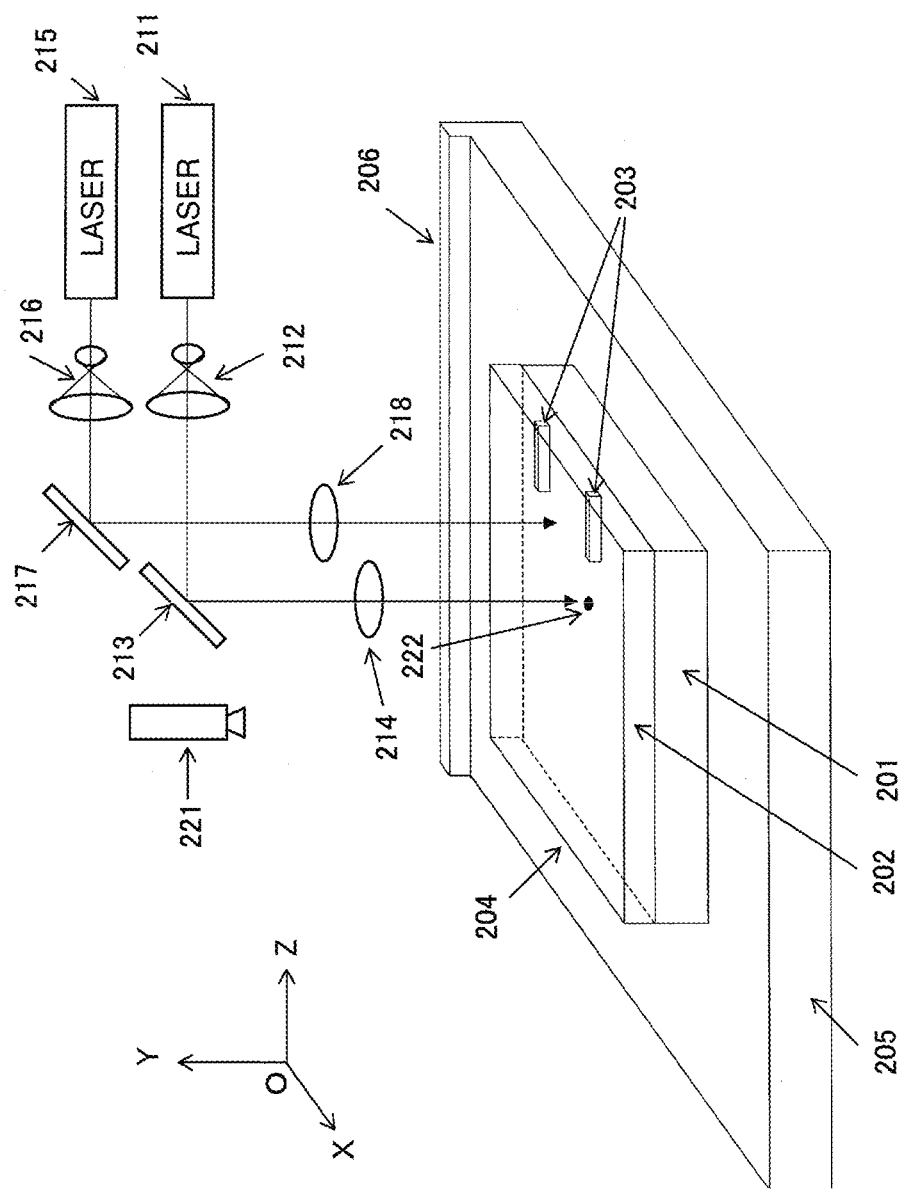
FIG. 4 is a diagram for explaining a method of manufacturing a groove in a hybrid optical device according to a second embodiment of the present invention.

A second embodiment of the present invention will be described below. FIG. 4 is a diagram for explaining a method of manufacturing a groove of a hybrid optical device according to the second embodiment of the present invention. A quartz-based waveguide chip 204 used in the present embodiment includes an Si substrate 201, a quartz-based glass clad 202 deposited on the Si substrate 201, and a core (only a marker 203 being presented) formed inside the quartz-based glass clad 202.

Similarly to the first embodiment, the quartz-based waveguide chip 204 is placed on an XZ stage 205. The XZ stage 205 is configured such that the quartz-based waveguide chip 204 placed on the stage can be attached and fixed. Note that the attaching may be performed not only by the vacuum chuck but also by another method.

Similarly to the marker 103 of the first embodiment, the marker 203 indicating a planned cutting line of the quartz-based waveguide chip 204 is formed of the same material in the same layer as the core in the quartz-based glass clad 202.

In the present embodiment, two types of lasers 211 and 215 are used for processing the groove of the quartz-based waveguide chip 204.

In the first embodiment, since the clad and the substrate are made of the same material as the quartz-based glass, one laser is sufficient for processing the groove. However, in the present embodiment, a $CO_2$ laser is used as the laser 211 for glass processing and an YAG laser is used as the laser 215 for Si processing.

The reason why the YAG laser for Si processing is used separately from the $CO_2$ laser is that an oscillation wavelength of the YAG laser is 1.064 m, which is in the wavelength band corresponding to absorption characteristics of Si and is higher in an absorption coefficient of Si than the $CO_2$ laser having the oscillation wavelength of 10.6 m, so that the groove processing efficiency for Si is improved.

A beam expander 212 converts the light oscillated from the laser 211 into expanded collimated light. A horizontal/vertical optical path conversion mirror 213 converts a direction of the beam so that the light beam passing through the beam expander 212 is reflected vertically. A condensing lens 214 condenses the light reflected by the horizontal/vertical optical path conversion mirror 213 and narrows a diameter of the beam. Thus, as shown in FIG. 4, the quartz-based waveguide chip 204 is irradiated with the $CO_2$ laser light from above.

Similarly, a beam expander 216 converts the light oscillated from the laser 215 into expanded collimated light. A horizontal/vertical optical path conversion mirror 217 converts a direction of the beam so that the light beam passing through the beam expander 216 is reflected vertically. A condensing lens 218 condenses the light reflected by the horizontal/vertical optical path conversion mirror 217 and narrows a diameter of the beam. Thus, the quartz-based waveguide chip 204 is irradiated with YAG laser light from above.

Since the optical systems of the $CO_2$ laser and the YAG laser are disposed so as not to interfere with each other and the respective optical systems are independent of each other, different positions on the XZ stage 205 are irradiated with the laser light. Therefore, as will be described below, since it is necessary to irradiate the same position on the quartz-based waveguide chip 204 with light from two lasers 211 and 215 in order to manufacture the groove, the laser 211 may irradiate $CO_2$ laser light to form a groove in the quartz-based glass clad 202 of the quartz-based waveguide chip 204, and then the XZ stage 205 may be moved to irradiate YAG laser from the laser 215 to form a groove in the Si substrate 201.

Figure 5:
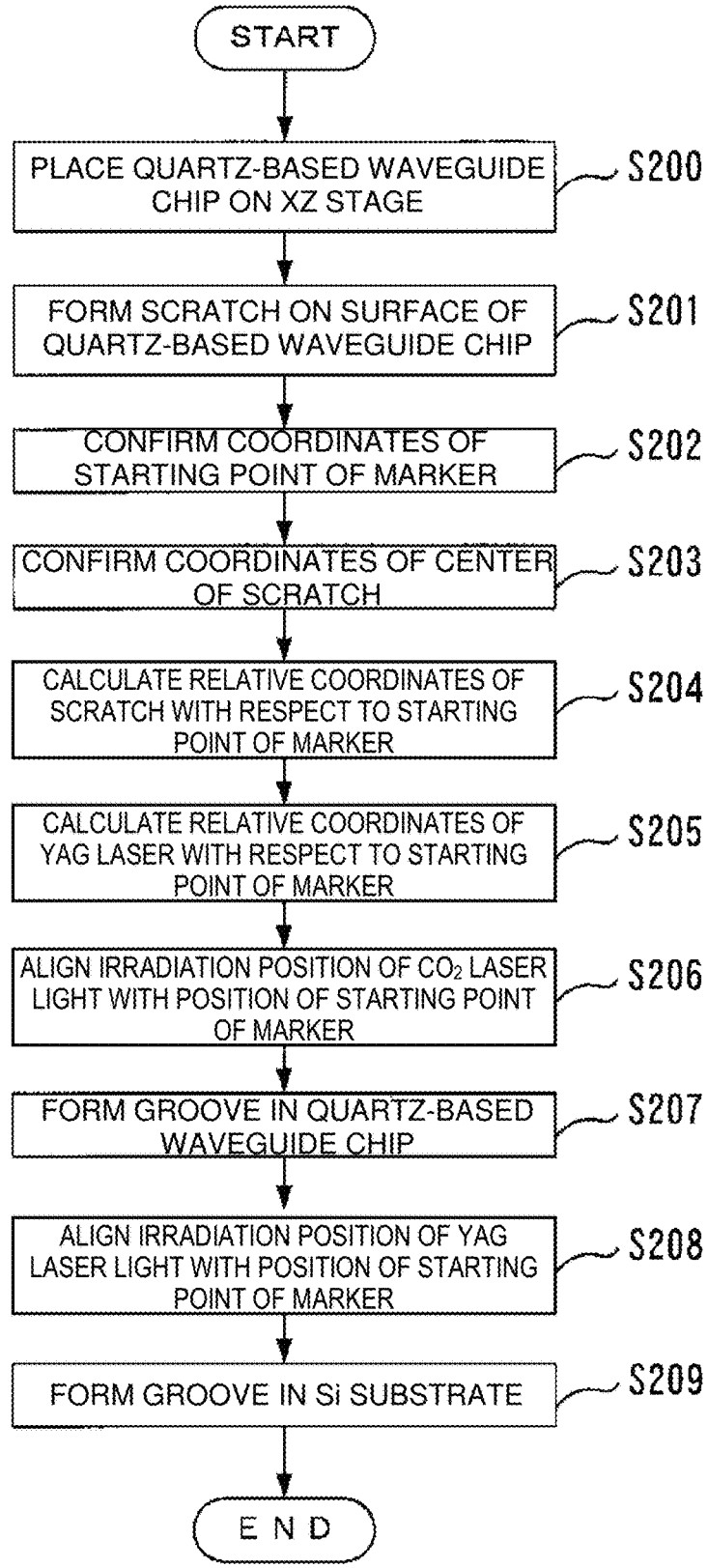
FIG. 5 is a flowchart for explaining the method of manufacturing the groove in the hybrid optical device according to the second embodiment of the present invention.
Figure 6:
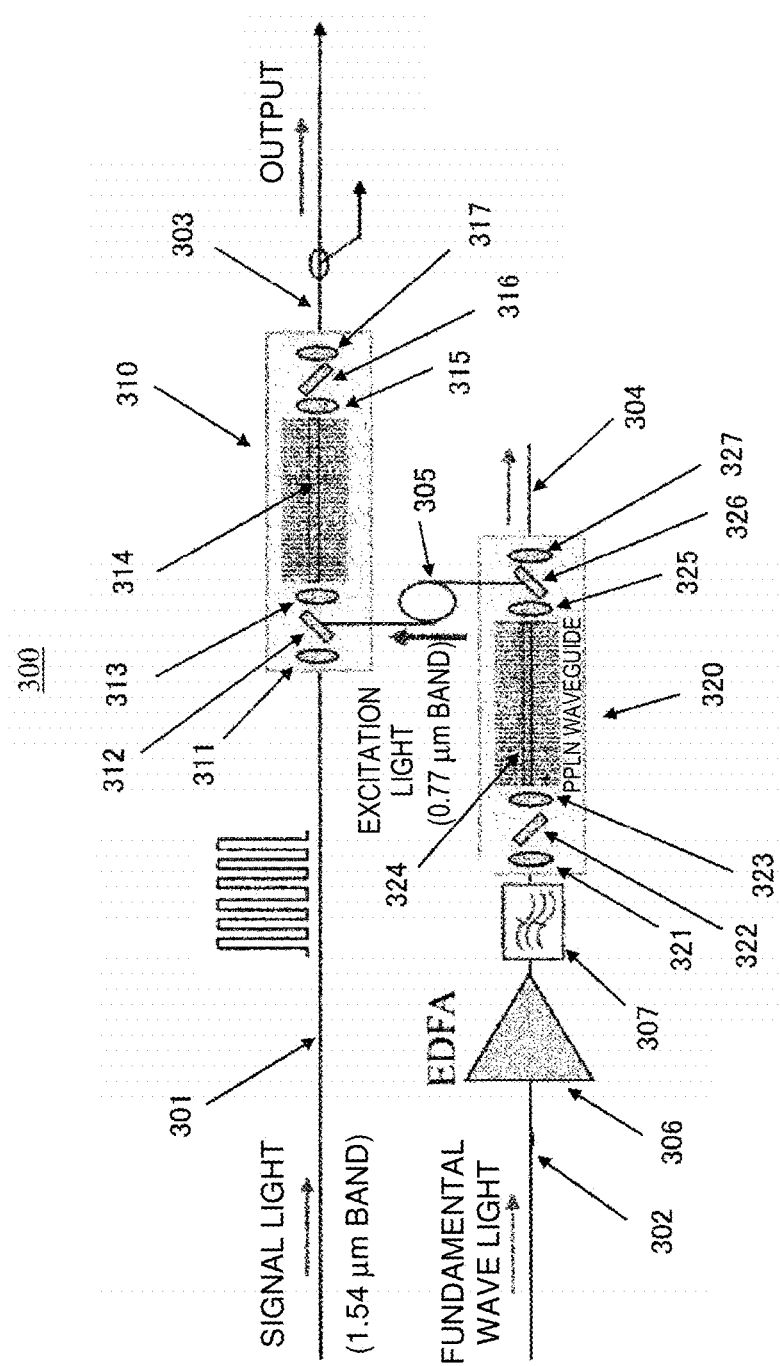
FIG. 6 is a schematic diagram showing a configuration of a conventional bulk component type PPLN module.

FIG. 5 is a flowchart for explaining a groove manufacturing method of the present embodiment.

First, the quartz-based waveguide chip 204 is placed on the XZ stage 205 so that a Z-axis direction of the XZ stage 205 is parallel to an in-chip plane extending direction of the groove in the quartz-based waveguide chip 204 (extending direction of the marker 203), and the quartz-based waveguide chip 204 is attached and fixed (step S200 in FIG. 5). As in the first embodiment, for example, a rectangular parallelepiped projection 206, a side surface of which is parallel to the Z-axis direction is previously provided on the XZ stage 205 and the quartz-based waveguide chip 204 may be pressed against the side surface of the projection 206 to be parallel.

After the quartz-based waveguide chip 204 is placed on the XZ stage 205, the quartz-based waveguide chip 204 is irradiated with the $CO_2$ laser light to form a scratch 222 on the surface of the quartz-based waveguide chip 204 (step S201 in FIG. 5). At this time, the laser light is irradiated for a short time so that the scratch 222 is formed only on the surface of the quartz-based waveguide chip 204.

As in the first embodiment, the microscope 221 confirms XZ coordinates (X1, Z2) of a starting point of the marker 203 (step S202 in FIG. 5), and then confirms XZ coordinates (X2, Z2) of a center of the scratch 222 (step S203 in FIG. 5)

As in the first embodiment, differences ($\Delta XCO2=X1-X2$ and $\Delta Z CO2=Z1-Z2$) between the XZ coordinates (X1, Z1) of the starting point of the marker 203 and the XZ coordinates (X2, Z2) of the center of the scratch 222 are calculated, so that relative coordinates of the scratch 222 (=irradiation position of the $CO_2$ laser) with respect to the starting point of the marker 203 can be calculated (step S204 in FIG. 5).

Further, differences $\Delta XYAG$ and $\Delta ZYAG$ between the XZ coordinates (X1, Z1) of the starting point of the marker 203 and the irradiation position of the YAG laser can be calculated based on the differences $\Delta XCO2$ and $\Delta ZCO2$ and the known relative coordinates of the irradiation position of the YAG laser with respect to the irradiation position of the $CO_2$ laser, and the relative coordinates of the irradiation position of the YAG laser with respect to the starting point of the marker 203 can be calculated (step S205 in FIG. 5).

The relative coordinates of the irradiation position of the YAG laser with respect to the irradiation position of the CO2 laser can be obtained in such a manner that thermal paper is placed on the XZ stage 205 before the quartz-based waveguide chip 204 is placed, the thermal paper is simultaneously irradiated with the CO2 laser light and the YAG laser light to change the thermal paper to black, and XZ coordinates (X3, Z3) of a color change position by the CO2 laser light and XZ coordinates (X4, Z4) of a color change position by the YAG laser light are confirmed by a method using the microscope 221 as in steps S102, S103, S202, and S203. In other words, differences ($\Delta$XYAG=X3−X4 and $\Delta$ZYAG2=Z3−Z4) between the XZ coordinates (X3, Z3) of the irradiation position of the CO2 laser and the XZ coordinates (X4, Z4) of the irradiation position of the YAG laser are calculated, so that the relative coordinates of the irradiation position of the YAG laser with respect to the irradiation position of the CO2 laser can be obtained in advance.

Next, the XZ stage 205 is moved to set the position of the XY stage 205 to a position (X1+$\Delta$XCO2, Z1+$\Delta$ZCO2) obtained by adding the differences $\Delta$XCO2 and $\Delta$ZCO2 to the XZ coordinates (X1, Z1) of the starting point of the marker 203, so that the irradiation position of the CO2 laser light can be aligned with the position of the starting point of the marker 203 (step S206 in FIG. 5).

After such alignment, the groove is formed in the quartz-based waveguide chip 204 in such a manner that the quartz-based waveguide chip 204 is irradiated with the CO2 laser light and the XZ stage 205 is moved in Z-axis direction (step S207 in FIG. 5).

As in the first embodiment, a quartz-based glass clad 202 of the quartz-based waveguide chip 204 is melted by an increase in power of the laser 211. Then, an assist gas such as a nitrogen gas is sprayed from a nozzle (not shown) mounted coaxially with the CO2 laser light with which the quartz-based waveguide chip 204 is irradiated, thereby a vaporized glass component is blown off. In this way, a groove is formed in the quartz-based glass clad 202 of the quartz-based waveguide chip 204 when the quartz-based glass is melted with the laser light and the vaporized glass component is blown off with the assist gas. The quartz-based glass clad 202 is removed, so that Si is exposed under the portion.

The irradiation of the CO2 laser light from the laser 211 is stopped at the time when the groove of a desired length is formed along the marker 203, and then the XZ stage 205 is moved to set the position of the XY stage 205 to a position (X+$\Delta$XYAG, Z1+$\Delta$ZYAG) obtained by adding the differences $\Delta$XYAG and $\Delta$ZYAG to the XZ coordinates (X1, Z1) of the starting point of the marker 203, so that the irradiation position of the YAG laser light can be aligned with the position of the starting point of the marker 203 (step S2o8 in FIG. 5).

After such alignment, the groove is formed in the Si substrate 201 of the quartz-based waveguide chip 204 in such a manner that the quartz-based waveguide chip 204 is irradiated with the YAG laser light and the XZ stage 205 is moved in Z-axis direction (step S209 in FIG. 5).

A wavelength of the YAG laser is 1.064 m, and the YAG laser light absorbed by Si, and is converted into heat. The Si substrate 201 is melted by an increase in power of the laser 215. Then, an assist gas such as a nitrogen gas is sprayed from a nozzle (not shown) mounted coaxially with the YAG laser light with which the quartz-based waveguide chip 204 is irradiated, thereby a vaporized Si is blown off. In this way, a groove is formed in the Si substrate 201 when the Si substrate is melted with the laser light and the vaporized Si is blown off with the assist gas.

The irradiation of the YAG laser light from the laser 215 is stopped at the starting point at the time when the groove of a desired length is formed along the marker 203.

As in the first embodiment, the groove is desirably formed to have a margin in a length of the marker 203 in the in-chip plane direction rather than the desired length of the groove in the in-chip plane direction (Z-axis direction), thereby allowing the marker 203 to remain on the quartz-based waveguide chip 204 in the extending direction of the groove at the time when the irradiation of the YAG laser light is stopped.

As is clear from the description of FIGS. 7, 9, and 10, since it is necessary to form grooves in two positions of the quartz-based waveguide chip 204, the marker 203 is also formed in two positions. Accordingly, after the process described in FIG. 5 is performed for one marker 203, the processes of steps S202 to S209 may be performed again for the other marker 203.

The shape of the quartz-based waveguide chip 204 in which the groove is manufactured is the same as that in FIG. 3, and a bonding method of the quartz-based waveguide chip 204 and the PPLN waveguide chip (secondary nonlinear waveguide chip) are the same as the method described with reference to FIGS. 7 to 10, and will not be presented.

Thus, according to the present embodiment, it is possible to obtain the same effect as that of the first embodiment when the substrate of the quartz-based waveguide chip 204 is made of Si.

In the present embodiment, the fundamental wave of the YAG laser is used for processing Si, but laser light of the wavelength band to be absorbed by Si may be used without being limited thereto.

INDUSTRIAL APPLICABILITY

Embodiments of the present invention are applicable to a technique for bonding a quartz-based waveguide chip and a secondary nonlinear waveguide chip together.

REFERENCE SIGNS LIST 101 quartz substrate
102, 202 quartz-based glass clad
103, 203 marker
104, 204 quartz-based waveguide chip
105, 205 XZ stage
106, 206 projection
111, 211, 215 laser
112, 212, 216 beam expander
113, 213, 217 horizontal/vertical optical path conversion mirror
114, 214, 218 condensing lens
121, 221 microscope
122, 222 scratch
406 groove.

The invention claimed is:
1. A method of manufacturing a groove in a hybrid optical device, the method comprising:
forming a marker indicating a planned cutting line extending from a connection end surface of a quartz-based waveguide chip in an in-chip plane direction by processing a core layer of a waveguide of the quartz-based waveguide chip;

aligning an irradiation position of laser light with a position of a starting point of the marker while quartz-based waveguide chip is placed on a stage; and manufacturing the groove on the connection end surface of the quartz-based waveguide chip so as to divide a first region where light propagates through the waveguide from a second region where the light does not propagate by moving the stage in an extending direction of the marker while irradiating the quartz-based waveguide chip with the laser light from an upper side of the quartz-based waveguide chip;

wherein the groove is provided on the connection end surface of the quartz-based waveguide chip with a secondary nonlinear waveguide chip having a periodically poled structure to divide the first region from the second region; and wherein the connection end surface of the quartz-based waveguide chip is bonded to a connection end surface of the secondary nonlinear waveguide chip with an adhesive in the second region.

2. The method of manufacturing a groove in a hybrid optical device according to claim 1, wherein:
the waveguide is formed on a substrate made of quartz-based glass;
the laser light is irradiated from a laser when the groove is manufactured; and
an oscillation wavelength of the laser is in a wavelength band corresponding to absorption characteristics of the quartz-based glass.

3. The method of manufacturing a groove in a hybrid optical device according to claim 2, wherein aligning the irradiation position of the laser light with the position of the starting point of the marker includes:
irradiating the quartz-based waveguide chip with the laser light while the quartz-based waveguide chip is placed on the stage to form a scratch on a surface of the quartz-based waveguide chip;
moving the stage and obtaining coordinates of the starting point of the marker based on a position of the stage at a time when the starting point of the marker comes to a center of a visual field of a microscope installed above the quartz-based waveguide chip;
moving the stage and obtaining, based on a position of the stage at a time when a center of the scratch comes to the center of the visual field of the microscope, coordinates of the center of the scratch; and
aligning the irradiation position of the laser light with the position of the starting point of the marker by moving the stage based on relative coordinates of the scratch with respect to the starting point of the marker.

4. The method of manufacturing a groove in a hybrid optical device according to claim 1, wherein:
the waveguide is made of quartz-based glass on an Si substrate;
when the groove is manufactured, laser light is irradiated from a first laser to process the quartz-based glass and laser light is irradiated from a second laser to process the Si substrate;
an oscillation wavelength of the first laser is in a wavelength band corresponding to absorption characteristics of the quartz-based glass; and
an oscillation wavelength of the second laser is in a wavelength band corresponding to absorption characteristics of Si.

5. The method of manufacturing a groove in a hybrid optical device according to claim 4, wherein aligning the irradiation position of the laser light with the position of the starting point of the marker includes:
irradiating the quartz-based waveguide chip with the laser light from the first laser while the quartz-based waveguide chip is placed on the stage to form a scratch on a surface of the quartz-based waveguide chip;
moving the stage and obtaining coordinates of the starting point of the marker based on a position of the stage at a time when the starting point of the marker comes to a center of a visual field of a microscope installed above the quartz-based waveguide chip;
moving the stage and obtaining, based on a position of the stage at a time when a center of the scratch comes to the center of the visual field of the microscope, coordinates of the center of the scratch;
aligning an irradiation position of the laser light from the first laser with the position of the starting point of the marker by moving the stage based on relative coordinates of the scratch with respect to the starting point of the marker; and
aligning an irradiation position of the laser light from the second laser with the position of the starting point of the marker by moving the stage based on the relative coordinates of the scratch with respect to the starting point of the marker and known relative coordinates of the irradiation position of the second laser with respect to the irradiation position of the first laser.

6. The method of manufacturing a groove in a hybrid optical device according to claim 1, wherein manufacturing the groove includes blowing off a component vaporized by irradiation of the laser light with an assist gas.

7. A hybrid optical device comprising:
a quartz-based waveguide chip including a first waveguide comprising quartz-based glass as a main material; and
a secondary nonlinear waveguide chip including a second waveguide comprising a secondary nonlinear optical material having a periodically poled structure;
wherein a groove is disposed on a connection end surface of the quartz-based waveguide chip with the secondary nonlinear waveguide chip to divide a first region where light propagates through the first waveguide from a second region where light does not propagate;
wherein the connection end surface of the quartz-based waveguide chip is bonded to a connection end surface of the secondary nonlinear waveguide chip with an adhesive provided in the second region; and
wherein a marker extending in an in-chip plane direction from an end point of the groove extending in the in-chip plane direction from the connection end surface of the quartz-based waveguide chip is disposed in a core layer of the first waveguide of the quartz-based waveguide chip.

8. The hybrid optical device according to claim 7, wherein the first waveguide is disposed on a quart-based glass substrate.

9. The hybrid optical device according to claim 7, wherein the first waveguide is disposed on a Si substrate.

10. A method of manufacturing a groove in a hybrid optical device, the method comprising:
forming a marker indicating a planned cutting line extending from a connection end surface of a quartz-based waveguide chip in an in-chip plane direction by processing a core layer of a waveguide of the quartz-based waveguide chip;

aligning an irradiation position of laser light with a position of a starting point of the marker while quartz-based waveguide chip is placed on a stage; and manufacturing the groove on the connection end surface of the quartz-based waveguide chip so as to divide a first region where light propagates through the waveguide from a second region where the light does not propagate by moving the stage in an extending direction of the marker while irradiating the quartz-based waveguide chip with the laser light from an upper side of the quartz-based waveguide chip.

11. The method according to claim 10, wherein the groove is provided on the connection end surface of the quartz-based waveguide chip with a secondary nonlinear waveguide chip having a periodically poled structure to divide the first region from the second region.

* * * * *